No. 760,000. PATENTED MAY 17, 1904.
P. LAFORTUNE.
EYEGLASS FRAME.
APPLICATION FILED JAN. 16, 1904.
NO MODEL.
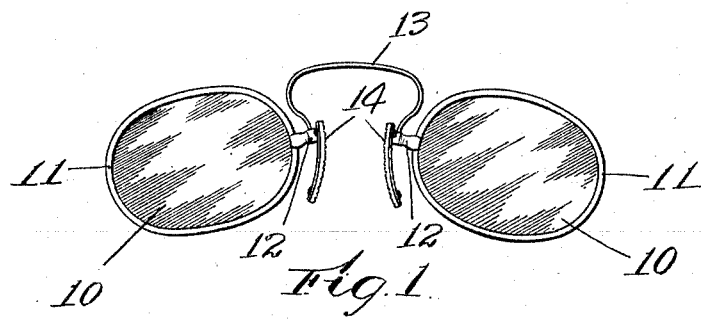
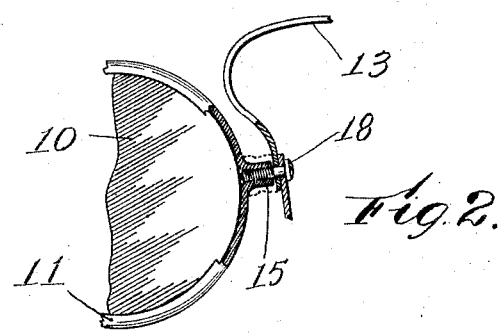
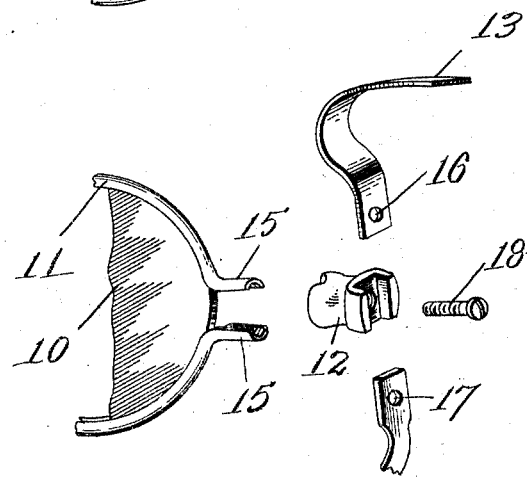

No. 760,000.                                    Patented May 17, 1904.

UNITED STATES PATENT OFFICE.

PETER LAFORTUNE, OF SOUTHBRIDGE, MASSACHUSETTS.

EYEGLASS-FRAME.

SPECIFICATION forming part of Letters Patent No. 760,000, dated May 17, 1904.

Application filed January 16, 1904. Serial No. 189,265. (No model.)

*To all whom it may concern:*

Be it known that I, PETER LAFORTUNE, a citizen of the United States, residing at Southbridge, in the county of Worcester and State of Massachusetts, have invented a new and useful Eyeglass-Frame, of which the following is a specification.

This invention relates to an eyeglass-frame which has been designed to provide a light, strong, and inexpensive construction in which the parts are secured together in a simple and direct manner and without the use of solder.

To these ends this invention consists of the eyeglass-frame as an article of manufacture and of the combinations of parts therein, as hereinafter described, and more particularly pointed out in the claims at the end of this specification.

In the accompanying drawings, Figure 1 is a front view of a pair of eyeglasses constructed according to this invention. Fig. 2 is an enlarged fragmentary view thereof, the position of one of the tubular connecting-posts being indicated by dotted lines; and Fig. 3 is a perspective view showing the several detached parts of an eyeglass-frame constructed according to this invention.

In making eyeglass-frames of that class in which the lenses or eyepieces are held in place by rims it has heretofore been customary to connect the rims to the posts by means of soldered or brazed joints, and in order to permit the lenses to be inserted or removed from their rims the outer ends of the rims have usually been connected so that the rims may be spread or opened when required.

The securing of the parts of an eyeglass-frame together by soldering or brazing is a comparatively delicate operation, which is expensive and which can only be performed by skilled labor. In addition to this the joints or protruding bosses at the outer ends of the eyeglass-rims are comparatively unsightly and are especially undesirable, as they are more or less confusing to the vision.

The especial object of the present invention is to provide a form of eyeglass-frame in which the rims may be opened or spread apart from their inner ends for the insertion or removal of the lenses and in which the rims are fastened to tubular posts by means of projecting ends which fit into and are secured in the tubular posts, these ends preferably being internally screw-threaded and fastened by the same screw which serves to hold one of the nose-cushions in place and to make connection with the spring of the eyeglass-frame.

Referring to the drawings and in detail, a pair of eyeglasses constructed according to this invention as herein illustrated comprises the lenses or glasses 10, which are mounted in rims 11. At the inner ends of the rims 11 are the tubular posts 12, which connect to the spring 13 and to the nose-cushions 14.

In the construction illustrated I have shown the ordinary arched or bowed spring 13, although it is to be understood that this form of spring has been selected for the purposes of illustration merely, and this is also true of the form of nose-cushions 14.

The special construction of the eyeglass-rims and the manner in which the parts are fastened together are most clearly illustrated in Figs. 2 and 3. As shown in these figures, each of the rims 11 is provided with projecting ends 15, which are internally screw-threaded. The posts 12 are of tubular form, each having a plain hole bored longitudinally through the same, and at its opposite ends each of the posts 12 is slotted to fit onto an eyeglass-rim and to receive the ends of the spring 13 and nose-cushion arm. The spring 13 is provided with a transverse hole 16 and the nose-cushion arm is provided with a transverse hole 17. A screw 18, which is somewhat longer than the ordinary fastening-screw, is passed through the holes 16 and 17, and the end of the screw is threaded into the ends 15, as shown in Fig. 2. By means of this construction I have provided an eyeglass-frame in which the parts are secured together without soldering or brazing.

The frame may be readily taken apart for repair or renewals, and the assembling of this form of eyeglass-frame can be accomplished more readily than other forms of eyeglass-frames with which I am familiar, this being readily done by unskilled labor.

A still further advantage in the use of an eyeglass-frame constructed according to this invention is due to the fact that there are no unsightly projections or posts at the outer ends of the eyeglass-rims which tend to obstruct and confuse the vision.

I am aware that numerous changes may be made in practicing this invention by those who are skilled in the art without departing from the scope thereof as expressed in the claims. I do not wish, therefore, to be limited to the construction I have herein shown and described; but What I do claim, and desire to secure by Letters Patent of the United States, is—

1. As an article of manufacture, an eyeglass-frame comprising lens-rims, a spring, tubular posts, each of the rims having internally-threaded extended ends which are fitted into one of the tubular posts, and screws extending longitudinally through the tubular posts and threaded into the rim ends.

2. As an article of manufacture, an eyeglass-frame comprising lens-rims, a spring, nose-cushions, tubular connecting-posts, each of the lens-rims having internally-threaded extended ends which fit into one of the tubular posts, and screws, the heads of which fasten the spring and nose-cushions in place, and the shanks of which are threaded into the rim ends.

3. As an article of manufacture, an eyeglass-frame comprising lens-rims having internally-threaded extended ends, a spring having a transverse hole near each end, nose-cushions each carried by an arm transversely perforated near its end, tubular connecting-posts having grooved faces for engaging a lens-rim, and for receiving the spring and supporting-arm of a nose-cushion respectively, and two fastening-screws, the head of each screw fastening the spring and one of the nose-cushions, and the shank of each screw being threaded into the ends of a lens-rim.

In testimony whereof I have hereunto set my hand in the presence of two subscribing witnesses.

PETER LAFORTUNE.

Witnesses:
PHILIP W. SOUTHGATE,
J. ELMER HALL.